United States Patent [19]

Green

[11] Patent Number: 4,663,472
[45] Date of Patent: May 5, 1987

[54] TRANSESTERIFICATION PROCESS

[75] Inventor: Michael J. Green, Hedon, England

[73] Assignee: BP Chemicals Limited, London, England

[21] Appl. No.: 696,320

[22] Filed: Jan. 30, 1985

[30] Foreign Application Priority Data

Feb. 4, 1984 [GB] United Kingdom ................. 8402995

[51] Int. Cl.$^4$ ................. C07C 125/065; C07C 125/073
[52] U.S. Cl. ..................................... 560/024; 560/25; 560/26; 560/115; 560/157; 560/158
[58] Field of Search ..................... 560/24, 25, 26, 115, 560/157, 158

[56] References Cited

U.S. PATENT DOCUMENTS 3,950,285  4/1976  Wolgemuth ...................... 560/26 X

FOREIGN PATENT DOCUMENTS 2943549  5/1981  Fed. Rep. of Germany ........ 560/24

OTHER PUBLICATIONS

Adams et al, Chemical Reviews, vol. 65 (1965) 567, 570, 571.
Gaylord et al, Jour. of Org. Chem., vol. 18, (1953) 1632–1637.

*Primary Examiner*—Bernard Helfin
*Attorney, Agent, or Firm*—Brooks, Haidt, Haffner & Delahunty

[57] ABSTRACT

A process for the transesterification of urethanes comprises reacting a urethane with an alcohol at elevated temperature in the presence of a Lewis base containing catalyst.

The process is particularly useful when the alcohol used is a polyol since the product of the transesterification is a polyurethane. Since urethanes can be generated from amines and organic carbonates using the methods of the prior art, the present invention provides processes for the manufacture of polyurethanes from amines which avoid the use of either phosgene or isocyanates both of which are extremely toxic.

19 Claims, No Drawings

TRANSESTERIFICATION PROCESS

The present invention relates to the transesterification of a urethane by reacting said urethane with an alcohol.

Urethanes, which are esters of carbamic acid $H_2NCO_2H$ or a substituted derivative thereof, are commercially important materials. In particular polyurethanes, are widely applied in the polymer industry as resins, foams, elastomers and the like.

Polyurethanes are prepared industrially by the reaction of a polyfunctional isocyanate with a polyfunctional alcohol. The polyfunctional isocyanate is usually prepared by the reaction of a polyfunctional amine with phosgene. Thus in a typical polyurethane producing process, a mixture of diaminotoluene isomers is reacted with phosgene to produce a mixture of toluene diisocyanate (TDI) isomers. The TDI is then reacted with a polyfunctional polyether polyol to produce the polyurethane.

The above method of preparing polyurethanes has the drawback that both phosgene and the isocyanate are extremely toxic materials. It is therefore necessary to take strict safety precautions when handling such materials in order to avoid exposure of personnel associated with the process. Because of the toxicity risk any method of preparing polyurethanes or indeed any urethane which avoids the use of phosgene and isocyanates is therefore attractive.

A possible method of avoiding the use of isocyanates is to replace them with an alternative nontoxic feedstock. It has now been discovered that by replacing the isocyanate with a molecule having two or more urethane (carbamic acid ester) groups it is possible, with the addition of certain catalysts, to engineer the transesterification reaction which, in the presence of a polyfunctional alcohol generates a polyurethane. Moreover, the molecule having two or more urethane groups can, in the case where the urethane groups are alkyl carbamic acid esters; be prepared by reaction of the appropriate amine with an alkyl carbonate using the methods of the prior art, e.g. U.S. Pat. No. 4,268,684, such as

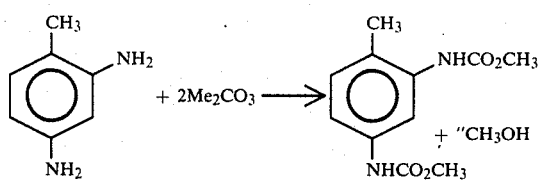

It is therefore possible to devise a process for the preparation of (poly)urethanes, starting with an amine which avoids the use of both phosgene and isocyanates and hence is intrinsically safer to operate.

It is an important feature of the above process that certain catalysts are able to catalyse a transesterification reaction between a molecule having two or more urethene groups with a polyfunctional alcohol. The skilled man however will realise that this reaction is a specific embodiment of a more general invention relating to the transesterification of any molecule containing a urethane group with any alcohol in the presence of the catalysts.

Accordingly, the present invention provides a process for the transesterification of urethanes which process comprises reacting the urethane with an alcohol at elevated temperature in the presence of a Lewis base containing catalyst.

By the term transesterification process is meant a reaction in which one or more ester groups of the urethane are exchanged with an equivalent number of ester groups derived from one or more alcohol molecules. An example of such a transesterification process is $$CH_3NHCO_2CH_3 + C_2H_5OH$$
$$CH_3NHCO_2C_2H_5 + CH_3OH$$

During the exchange of ester groups, an alcohol corresponding to the ester group which has been exchanged is created.

The urethane may be any lower aliphatic ester of a carbamic acid and has the chemical formula $R^2R^3NCO^2R^1$ where $R^1$ is an aliphatic, substituted or unsubstituted hydrocarbyl radical containing up to 12 carbon atoms. $R^2$ and $R^3$ can be a hydrogen atom, or a substituted or unsubstituted aliphatic, cycloaliphatic, aromatic or heterocyclic hydrocarbyl radical containing up to 20 carbon atoms. Preferred examples of urethanes are the methyl, ethyl and propyl esters of N-phenyl carbamic acid or alkyl substituted derivatives thereof.

Preferably, the hydrocarbyl groups $R^2$ and $R^3$ may also contain as substitutent one of more further carbamic acid ester groupings as in the case of molecules such as

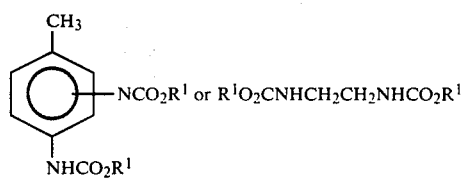

In such cases the $R^1$ ester groups may be the same or different.

The alcohol used in the present process can in principle be any alcohol. Thus it can be an aliphatic or an aromatic alcohol and it can be an unsaturated alcohol such as allyl alcohol. Preferred alcohols include methanol, ethanol, propanol, butanol, benzyl alcohol, phenol and cyclohexanol.

In addition to the alcohols described above polyols, i.e. alcohols having more than one hydroxyl group, can be used. These can be simple polyols for example ethylene glycol, propylene glycol, glycerol, pentaerythritol, an sorbitol or preferably polyether polyols prepared by polymerising ethylene oxide and/or propylene oxide in the presence of a simple polyol.

As mentioned earlier, when a polyol such as a polyether polyol and a molecule having two or more urethane groups are used with the catalyst of the present invention a process for the preparation of polyurethanes is provided.

Accordingly, an embodiment of the present invention provides a process for the preparation of a polyurethane which process comprises reacting a molecule having two or more urethane groups with a polyol at elevated temperature in the presence of a Lewis base catalyst.

In such a process the preferred polyol is a polyether polyol of the type described previously.

The transesterification process described above are catalysed by a Lewis base containing catalyst. The term Lewis base is one familiar to the skilled man and is defined, for example, on page 614 of 'The Condensed Chemical Dictionary (10th Edition)' published by Van Nostrand Reinhold Company. Examples of Lewis bases include amines, phosphines, arsines and stibines. Suitably, the Lewis base used in the present invention is a strong base or is capable of generating a strong base in the presence of other catalyst components. Hence the Lewis base containing catalysts used in the present invention are themselves strongly basic.

Preferably, the Lewis base containing catalyst belongs to one or both of the following two classes of compounds;
(1) an amidine, and
(2) a Lewis base in the presence of an epoxide.

By the term amidine is meant a compound containing the grouping

Conveniently the free valencies on the nitrogen atom are attached to carbon atoms or hydrogen and the free valency on the carbon to another carbon or nitrogen atoms. In the last mentioned case the structure comprises a guanidine grouping.

A preferred class of amidines is the cyclic amidines. Cyclic amidines are defined as those amidines wherein at least one of the nitrogen atoms is part of an alicyclic or heterocyclic substituted or unsubstituted hydrocarbyl ring. In the case where the amidine is a guanidine then any two of the three nitrogen atoms may be in the same or different rings. Those nitrogen atoms which are not part of any such ring may form part of a substituted or unsubstituted hydrocarbyl group.

A preferred class of cyclic amidines is that in which the amidine group can form part of a fused ring system containing 6 and 5 membered rings or 6 and 7 membered rings or two six membered rings, as for example in 1,5-diazabicyclo[4.3.0]non-5-ene which has the formula

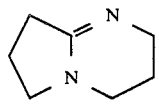

or 1,8-diazabicyclo[5.4.0]undec-7-ene of the formula

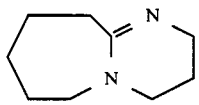

or 1,5,7-triazabicyclo[4.4.0]dec-5-ene of formula

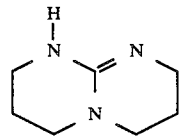

Where the catalyst comprises a Lewis base and an epoxide the epoxide which is used in the presence of the Lewis base is preferably a lower alkylene oxide such as ethylene oxide, propylene oxide or butylene oxide. A preferred class of Lewis base is that in which the Lewis base contains either trivalent nitrogen or phosphorus, e.g. amines such as triethylamines and phosphines such as triphenylphosphine. The Lewis base can also be an amidine.

The molar ratio of Lewis base to epoxide lies in the range 10:1 to 1:10.

For both classes of catalyst, the catalyst is added to the reaction mixture in amounts such that the final catalyst concentration is in the range 0.001 to 10% by weight of the total reaction mixture and is preferably in the range 0.001 to 5%. The molar ratio of urethane to alcohol should preferably lie in the range 1:5 to 5:1.

The Lewis base containing catalyst may be supported on an inert solid to render the catalyst insoluble in the reaction mixture. Such heterogeneous Lewis base containing catalysts are more easily separated from the reaction mixture at the end of the reaction than equivalent soluble (homogeneous) versions.

The amidine or guanidine catalysts described above may be supported by chemically or physically bonding the molecule to an inert solid. This can be achieved, for example, by bonding the surface atoms of the solid to one or more of the free valences of the amidine or guanidine group either directly or through an intermediate hydrocarbyl radical. In the case of cyclic amidines or guanidines the hydrocarbyl radical may constitute part of the ring structure of the molecule.

As an alternative to a supported amidine or guanidine catalyst, a supported Lewis base/epoxide catalyst can be used. In such catalysts, it is possible either
(i) to support the Lewis base on the inert solid and have the epoxide component initially present in solution with the reactants.
or (ii) to support the epoxide on the inert solid and have the Lewis base component initially present in solution with the reactants.

The epoxide component, if initially present in solution is suitably a lower alkylene oxide for example ethyene oxide, propylene oxide and butylene oxide. If the epoxide is supported on the inert solid it also may be bonded to the solid via one or more of the groups attached to the epoxide moiety. However, if the inert solid is an organic resin it is possible to prepare the epoxy modified resin directly by polymerising epoxy functionalised monomers.

The inert solid may be either organic, such as a resin or a polymer, e.g. polystyrene, a polystyrene/divinylbenzene copolymer, a polyacrylate, polypropylene and the like, or inorganic such as a silica, clay, diaomaceous earth, zeolite, alumina or aluminosilicate. Preferred supports are polystyrene and its copolymers with divinylbenzene, copolymers of glycidyl methacrylate and ethyene glycol dimethacrylate and the like.

Examples of the supported strong base catalysts are TBD supported on poystyrene or polystyrene/divinylbenzene copolymer, Amberlite IRA-93, Amberlyst I5 and Duolite A375.

The Lewis base containing catayst is suitably present on the solid in amounts corresponding to between 0.1 and 10 moles of catalyst per gram of solid.

It is clearly important that the solid is not degraded under the reaction conditions. Hence by the term 'inert solid' is meant a solid which does not undergo physical or chemical degradation during the reaction or subsequent processing. Since the reaction conditions may vary depending upon the nature of the reactants, reaction temperature, reaction time and the nature of any solvent used, the choice of inert solid will therefore reflect the particular needs and constraints of the process to be operated.

The reaction is carried out at elevated temperature, preferably in the range 50°–160° C., and at atmospheric or autogenous pressure. A pressure of an inert gas such as nitrogen can also be used if desired.

The reaction can be carried out batchwise or continuously.

As mentioned previously the invention described herein can be used to provide a integrated process for the production of a urethane from an amine which avoids the use of either phosgene or an isocyanate.

Accordingly, a further embodiment provides a process for the production of a second urethane from an amine which process comprises
(1) reacting the amine with a carbonate ester under conditions which generate a first urethane,
(2) reacting the first urethane with a alcohol at elevated temperature in the presence of a Lewis base containing catalyst to produce a second urethane.

The process is illustrated by the following equations

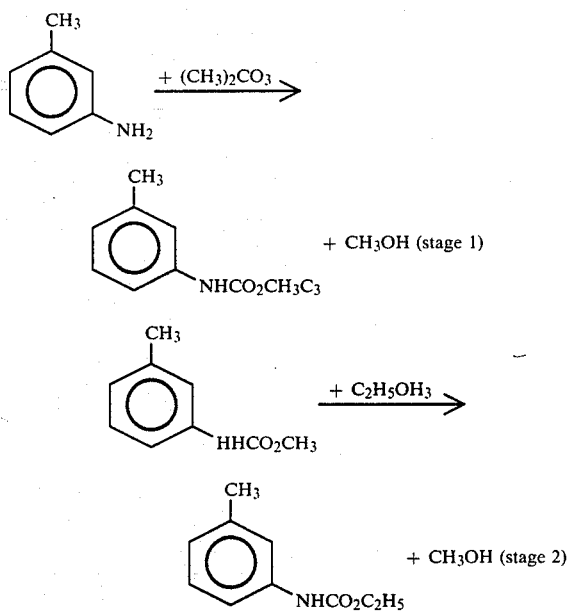

in which 2-amintoluene is converted into the second urethane ethyl N-tolylcarbamate via the first urethane methyl N-tolylcarbamate.

Preferably the process is operated with a diamine as the amine and a polyol as the alcohol since the product of the two stage process is then a polyurethane. A preferred diamine in such a clase is a toluene diamine isomer for example 2,4-diamino toluene.

The reaction occurring in stage 1 of the process has been described in for example U.S. Pat. No. 4,268,684 which discloses the use of carboxylic acid salts of various metals to catalyse the reaction. The information in this patent is incorporated herein by reference.

The preferred carbonate used in stage 1 of the above process is a dialkyl carbonate for example dimethyl carbonate.

The invention will be illustrated by reference to the following Examples.

EXAMPLE 1

A Fischer-Porter tube was charged with 5 g of methanol, 2.5 g of ethyl N-phenylcarbamate, and 0.25 g of 1,5,7-triazabicyclo[4.4.0]dec-5-ene (TBD). The tube was purged with nitrogen to remove air, pressurised to 80 psi with nitrogen, sealed, and finally heated to 120° C. with stirring. After 2 hours, the tube was cooled and depressurised. Analysis of the liquid product by gas chromatography showed a 92% conversion of ethyl N-phenylcarbamate to methyl N-phenylcarbamate.

EXAMPLE 2

Example 1 was repeated in the presence of 4 g of methanol, 1 g of ethyl N-phenylcarbamate and 0.015 g of TBD. Analysis of the liquid product showed a 15% conversion of ethyl N-phenylcarbamate to its methyl ester.

EXAMPLE 3

Example 2 was repeated but using 0.025 g of N,N,N'N'-tetramethyl-N''-t-butylguanidine in place of TBD. Analysis of the liquid product showed a 13% conversion of ethyl N-phenylcarbamate to its methyl ester.

EXAMPLE 4

Example 2 was repeated but using 0.04 g of 1,5-diazabicyclo[4.3.0]non-5-ene in place of TBD. Analysis of the liquid product showed a 7% conversion of ethyl N-phenylcarbamate to its methyl aster.

COMPARATIVE EXAMPLE A

Example 2 was repeated in the absence of a catalyst. Analysis of the liquid product showed that no reaction had occurred. This example, which does not constitute part of the invention described herein, shows that a catalyst is needed to effect transesterification.

EXAMPLE 5

Example 2 was repeated but using 0.06 g of 1,8-diazabicyclo[5.4.0]undec-7-ene in place of TBD. Analysis of the liquid product showed an 18% conversion of ethyl N-phenylcarbamate to its methyl ester.

EXAMPLE 6

A solution containing 4 g of methanol, 0.04 g of triethylamine and 0.04 g of propylene oxide was heated to 100° C. in a sealed Fischer-Porter tube under an initial nitrogen pressure of 80 psi. On cooling and depressurising, 1 g of ethyl N-phenylcarbamate was added, and the same procedure adopted as for Example 1. Analysis of the liquid product showed a 17% conversion of ethyl N-phenylcarbamate to its methyl ester.

COMPARATIVE EXAMPLE B

Example 6 was repeated in the absence of propylene oxide. Analysis of the liquid product showed that no reaction had occurred. This example shows that when a Lewis base such as triethylamine is used, it is necessary to have an alkylene oxide present.

EXAMPLE 7

A 25 ml round-bottom flask was charged with 3 g of toluene-2,4-dimethyldicarbamate, 6 g of ethylene glycol and 0.1 g of TBD. The temperature of the flask was raised to 150° C. and a colourless liquid (identified as methanol by GLC) distilled out. Subsequent analysis of the flask contents showed that quantitative conversion of the toluene-2,4-dimethyldicarbamate to toluene-2,4-bis(2-hydroxyethylcarbamate) had occurred.

EXAMPLE 8

Example 7 was repeated except that equimolar amounts of ethylene glycol and toluene-2,4-dimethyldicarbamate were used. On cooling the flask a glass-like resin was obtained which was shown by gel permeation chromatography and $^{13}C$ NMR spectroscopy to be a polyurethane.

I claim:

1. A process for the transesterification of urethane which process comprises reacting a urethane with an alcohol at elevated temperature in the presence of a catalyst which is either
   (i) an amidine, or
   (ii) a Lewis base selected from the group consisting of an amidine, an amine and a phosphine in the presence of an epoxide, which is a lower alkylene oxide.

2. A process as claimed in claim 1 characterised in that the Lewis base containing catalyst is an amidine.

3. A process as claimed in claim 2 characterised in that the amidine is a cyclic amidine.

4. A process as claimed in claim 2 characterised in that the amidine is a guanidine.

5. A process as claimed in claim 3 characterised in that the cyclic amidine is a cyclic guanidine.

6. A process as claimed in claim 3 characterised in that the cyclic amidine has an amidine group which forms part of a fused ring system containing 6 and 5 membered rings, or 6 and 7 membered rings or two six membered rings.

7. A process as claimed in claim 1 characterised in that the catalyst comprises said Lewis base in the presence of said epoxide.

8. A process as claimed in claim 1 characterised in that the Lewis base is selected from the group consisting of an amine and a phosphine.

9. A process as claimed in claim 1 characterised in that the Lewis base is an amidine.

10. A process as claimed in claim 1 characterised in that the Lewis base containing catalyst is supported on an inert solid.

11. A process for the preparation of a polyurethane which process comprises reacting a molecule having two or more urethane groups with a polyol at elevated temperature in the presence of a catalyst which is either
    (i) an amidine, or
    (ii) a Lewis base selected from the group consisting of an amidine, an amine and a phosphine in the presence of an epoxide, which is a lower alkylene oxide.

12. A process as claimed in claim 11 characterised in that the polyol is a polyether polyol.

13. A process for the production of a second urethane from an amine characterised in that the process comprises
    (1) reacting the amine with a carbonate ester under conditions which generate a first urethane,
    (2) reacting the first urethane with an alcohol at elevated temperature in the presence of a catalyst which is either
        (i) an amidine, or
        (ii) a Lewis base selected from the group consisting of an amidine, an amine and a phosphine in the presence of an epoxide which is a lower alkylene oxide, to produce a second urethane.

14. A process as claimed in claim 13 characterised in that the amine is a diamine and the alcohol is a polyol.

15. A process as claimed in claim 14 characterised in that the diamine is a toluene diamine isomer and that the polyol is a polyether polyol.

16. A process as claimed in claim 1,
    wherein said catalyst is selected from the group consisting of
    (1) an amidine, or a guanidine, and
    (2) said Lewis base in the presence of said epoxide,
    wherein, in (2), the molar ratio of Lewis base to epoxide is in the range 10:1 to 1:10,
    wherein the catalyst is added to the reaction mixture in amounts such that the final catalyst concentration is in the range 0.001 to 10% by weight of the total reaction mixture, and
    wherein the molar ratio of urethane to alcohol is in the range 1:5 to 5:1.

17. A process as claimed in claim 11,
    wherein said catalyst is selected from the group consisting of
    (1) an amidine, or a guanidine, and
    (2) said Lewis base in the presence of said epoxide,
    wherein, in (2), the molar ratio of Lewis base to epoxide is in the range 10:1 to 1:10,
    wherein the catalyst is added to the reaction mixture in amounts such that the final catalyst concentration is in the range 0.001 to 10% by weight of the total reaction mixture, and
    wherein the molar ratio of urethane to alcohol is in the range 1:5 to 5:1.

18. A process for the transesterification of urethanes which process comprises reacting a urethane with an alcohol at elevated temperature in the presence of a catalyst selected from the group consisting of
    1,5,7-triazabicyclo [4.4.0]dec-5-ene,
    N,N,N'N'-tetramethyl-N''-t-butylguanidine,
    1,5-diazabicyclo [4.3.0]non-5-ene,
    1,8-diazabicyclo [5.4.0]undec-7-ene, and
    triethylamine and propylene oxide.

19. A process for the preparation of a polyurethane, which process comprises reacting a molecule having two or more urethane groups with a polyol at elevated temperature in the presence of a catalyst selected from the group consisting of
    1,5,7-triazabicyclo [4.4.0]dec-5-ene,
    N,N,N'N'-tetramethyl-N''t-butylguanidine,
    1,5-diazabicyclo [4.3.0]non-t-ene,
    1,8-diazabicyclo-[5.4.0]undec-7-ene, and
    triethylamine and propylene oxide.

* * * * *

UNITED STATES PATENT AND TRADEMARK OFFICE
CERTIFICATE OF CORRECTION

PATENT NO. : 4,663,472
DATED : May 5, 1987
INVENTOR(S) : Michael James Green

It is certified that error appears in the above-identified patent and that said Letters Patent is hereby corrected as shown below:

In Specification Col. 3, lines 15-22 the structural formula should be drawn as follows:

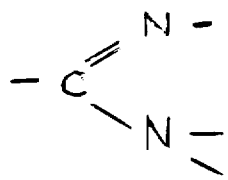

Col. 4, line 43, "via" should read -- *via* --

Signed and Sealed this

Twentieth Day of October, 1987

Attest:

DONALD J. QUIGG

Attesting Officer     Commissioner of Patents and Trademarks